United States Patent
Hwang et al.

(10) Patent No.: US 9,985,700 B2
(45) Date of Patent: May 29, 2018

(54) CHANNEL STATE FEEDBACK ENHANCEMENT IN DOWNLINK MULTIUSER SUPERPOSITION TRANSMISSION

(71) Applicant: MEDIATEK INC., Hsinchu (TW)

(72) Inventors: Chien-Hwa Hwang, Hsinchu County (TW); Lung-Sheng Tsai, Tainan (TW); Yi-Ju Liao, Hsinchu (TW); Pei-Kai Liao, Nantou County (TW); Weidong Yang, San Diego, CA (US)

(73) Assignee: MEDIATEK INC., HsinChu (TW)

( * ) Notice: Subject to any disclaimer, the term of this patent is extended or adjusted under 35 U.S.C. 154(b) by 99 days.

(21) Appl. No.: 15/150,001

(22) Filed: May 9, 2016

(65) Prior Publication Data
US 2016/0337879 A1 Nov. 17, 2016

Related U.S. Application Data

(60) Provisional application No. 62/160,099, filed on May 12, 2015.

(51) Int. Cl.
*H04B 7/0452* (2017.01)
*H04B 17/336* (2015.01)
(Continued)

(52) U.S. Cl.
CPC ......... *H04B 7/0452* (2013.01); *H04B 17/336* (2015.01); *H04L 5/006* (2013.01);
(Continued)

(58) Field of Classification Search
CPC . H04B 17/336; H04B 7/0452; H04L 27/0008; H04L 5/0023; H04L 5/0048;
(Continued)

(56) References Cited

U.S. PATENT DOCUMENTS

| | | | |
|---|---|---|---|
| 2008/0075033 A1* | 3/2008 | Shattil | H04B 7/026 370/328 |
| 2013/0163534 A1* | 6/2013 | Anderson | H04L 1/0026 370/329 |

(Continued)

FOREIGN PATENT DOCUMENTS

| | | |
|---|---|---|
| CN | 101472292 A | 7/2009 |
| CN | 102088340 A | 6/2011 |

(Continued)

OTHER PUBLICATIONS

International Search Report and Written Opinion of International Search Authority for PCT/CN2016/081780 dated Jul. 27, 2016 (11 pages).

*Primary Examiner* — Stephen J Clawson
(74) *Attorney, Agent, or Firm* — Imperium Patent Works; Zheng Jin (57) ABSTRACT

A method of performing downlink multiuser superposition transmission (MUST) with enhanced channel state information (CSI) feedback is proposed. When a user equipment (UE) reports CQI/SINR feedback for RI=RANK-2, the UE also reports a single beam CQI/SINR feedback for RI=RANK1. As a result, the scheduling base station can calculate the actual SINRs based on different MUST scenarios and thereby determining appropriate modulation and coding scheme (MCS) for the UE. Furthermore, if the granularity of the CQI table cannot reflect the high values of the single beam SINR, then a predefined scaling factor ($0<\beta<1$) known to both the base station and the UE may be applied.

21 Claims, 4 Drawing Sheets

(51) Int. Cl.
  *H04W 72/12* (2009.01)
  *H04L 5/00* (2006.01)
  *H04L 27/00* (2006.01)
(52) U.S. Cl.
  CPC ........ *H04L 5/0023* (2013.01); *H04L 27/0008* (2013.01); *H04W 72/1231* (2013.01); *H04L 5/0048* (2013.01); *H04L 5/0069* (2013.01)
(58) Field of Classification Search
  CPC ... H04L 5/006; H04L 5/0069; H04W 72/1231
  USPC .......................................................... 370/329
  See application file for complete search history.

(56) References Cited

U.S. PATENT DOCUMENTS

| | | | |
|---|---|---|---|
| 2014/0050276 A1 | 2/2014 | Zhang et al. | 375/267 |
| 2014/0293890 A1* | 10/2014 | Davydov | H04L 5/0085 370/329 |
| 2014/0369436 A1* | 12/2014 | Zhang | H04L 5/0091 375/267 |
| 2015/0023202 A1* | 1/2015 | Shattil | H04W 52/267 370/252 |
| 2015/0236765 A1* | 8/2015 | Yu | H04B 7/0452 375/267 |
| 2015/0264670 A1* | 9/2015 | Lee | H04L 5/0007 370/312 |
| 2015/0282122 A1* | 10/2015 | Kim | H04L 25/03898 370/329 |
| 2015/0341093 A1* | 11/2015 | Ji | H04B 1/707 375/267 |
| 2016/0165466 A1* | 6/2016 | Kim | H04L 5/0057 370/252 |
| 2016/0373178 A1* | 12/2016 | Nam | H04B 7/0617 |

FOREIGN PATENT DOCUMENTS

| | | |
|---|---|---|
| EP | 2076086 A2 | 7/2009 |
| EP | 2651066 A1 | 10/2013 |

\* cited by examiner

CHANNEL STATE FEEDBACK ENHANCEMENT IN DOWNLINK MULTIUSER SUPERPOSITION TRANSMISSION

CROSS REFERENCE TO RELATED APPLICATIONS

This application claims priority under 35 U.S.C. § 119 from U.S. Provisional Application No. 62/160,099, entitled "Channel State Feedback Enhancement in Downlink Multiuser Superposition Transmission," filed on May 12, 2015, the subject matter of which is incorporated herein by reference.

TECHNICAL FIELD

The disclosed embodiments relate generally to mobile communication networks, and, more particularly, to methods for channel state feedback in downlink multiuser superposition transmission.

BACKGROUND

Long Term Evolution (LTE) is an improved universal mobile telecommunication system (UMTS) that provides higher data rate, lower latency and improved system capacity. In LTE systems, an evolved universal terrestrial radio access network includes a plurality of base stations, referred as evolved Node-Bs (eNBs), communicating with a plurality of mobile stations, referred as user equipment (UE). A UE may communicate with a base station or an eNB via the downlink and uplink. The downlink (DL) refers to the communication from the base station to the UE. The uplink (UL) refers to the communication from the UE to the base station. LTE is commonly marketed as 4G LTE, and the LTE standard is developed by 3GPP.

In a wireless cellular communications system, multiuser multiple-input multiple-output (MU-MIMO) is a promising technique to significantly increase the cell capacity. In MU-MIMO, the signals intended to different users are simultaneously transmitted with orthogonal (or quasi-orthogonal) precoders. On top of that, the concept of a joint optimization of MU operation from both transmitter and receiver's perspective has the potential to further improve MU system capacity even if the transmission and precoding is non-orthogonal. For example, the simultaneous transmission of a large number of non-orthogonal beams/layers with the possibility of more than one layer of data transmission in a beam. Such non-orthogonal transmission could allow multiple users to share the same resource elements without spatial separation, and allow improving the multiuser system capacity for networks with a small number of transmit antennas (i.e. 2 or 4, or even 1), where MU-MIMO based on spatial multiplexing is typically limited by wide beamwidth.

An example of such joint Tx/Rx optimization associated with adaptive Tx power allocation and codeword level interference cancellation (CW-IC) receiver is recently a remarkable technical trend, including non-orthogonal multiple access (NOMA) and other schemes based on downlink multiuser superposition transmission (MUST). In MUST, the signals intended for two users are superposed and occupy the same time-frequency radio resource. To benefit from MUST, the two co-scheduled users generally need to have a large difference in the received signal quality, e.g., in terms of the received signal-to-interference-plus-noise ratio (SINR). In a typical scenario, one of the users is geometrically close to the base station, and the other user is geometrically far away from the base station. The former user and the latter user are also referred to as the near-user and far-user respectively.

In order to apply MUST precoding, the transmitting station is required to know the Channel State Information (CSI) of the radio channels connecting it to each of the receiving stations for transmission. In 3GPP LTE systems, it is common for the receiving stations (e.g., UEs) to measure CSI and report CSI to the transmitting station (e.g., eNB) via an uplink feedback channel. The content of CSI feedback contains RI (rank indicator), CQI (channel quality indicator), and PMI (precoding matrix indicator) for each downlink channel.

In the current LTE communication system, the UE determines the CQIs based on the output SINRs of an MMSE receiver. However, the feedback SINRs may not be the same as the actual SINRs of the UE. In a first scenario, when UE reports RI=1, but there are two spatial layers in the actual transmission. In a second scenario, when UE reports RI=2 with certain PMI, but the eNB uses a different PMI for MU-MIMO transmission. As a result, the CSI feedback received by the eNB does not reflect the actual channel state information of the UE, causing the eNB unable to perform MUST precoding effectively.

A solution is sought.

SUMMARY

A method of performing downlink multiuser superposition transmission (MUST) with enhanced channel state information (CSI) feedback is proposed. When a user equipment (UE) reports CQI/SINR feedback for RI=RANK-2, the UE also reports a single beam CQI/SINR feedback for RI=RANK1. As a result, the scheduling base station can calculate the actual SINRs based on different MUST scenarios and thereby determining appropriate modulation and coding scheme (MCS) for the UE. Furthermore, if the granularity of the CQI table cannot reflect the high values of the single beam SINR, then a predefined scaling factor ($0<\beta<1$) known to both the base station and the UE may be applied.

In one embodiment, a base station transmits reference signals to a plurality of user equipments (UEs) in a wireless communication network. The base station receives channel state information (CSI) feedback from a first UE. The CSI feedback comprises a RANK-2 channel quality indicator (CQI) associated with a first beam and a second beam and a RANK-1 CQI associated with a single beam. The base station schedules a downlink transmission to the first UE and a second co-channel UE over an allocated time-frequency radio resource using a multiuser superposition transmission (MUST) scheme. The base station determines a modulation and coding scheme (MCS) for the first UE based on the received CSI feedback and the MUST scheme. In one example, the RANK-2 CQI comprises a first feedback signal to interference plus noise ratio (SINR) at the first beam and a second feedback SINR at the second beam, and the RANK-1 CQI comprises a third feedback SINR at the single beam measured by the UE.

In another embodiment, a UE measures reference signals from a base station in a wireless communication network. The UE transmits channel state information (CSI) feedback to the base station. The CSI feedback comprises a RANK-2 channel quality indicator (CQI) associated with a first beam and a second beam and a RANK-1 CQI associated with a single beam. The UE receives a downlink transmission scheduled to the UE and a second co-channel UE over an allocated time-frequency radio resource using a multiuser superposition transmission (MUST) scheme. The UE applies a modulation and coding scheme (MCS) received from the base station, wherein the MCS is determined based on the CSI feedback and the MUST scheme. In one example, the RANK-2 CQI comprises a first feedback signal to interference plus noise ratio (SINR) at the first beam and a second feedback SINR at the second beam, and the RANK-1 CQI comprises a third feedback SINR at the single beam measured by the UE.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
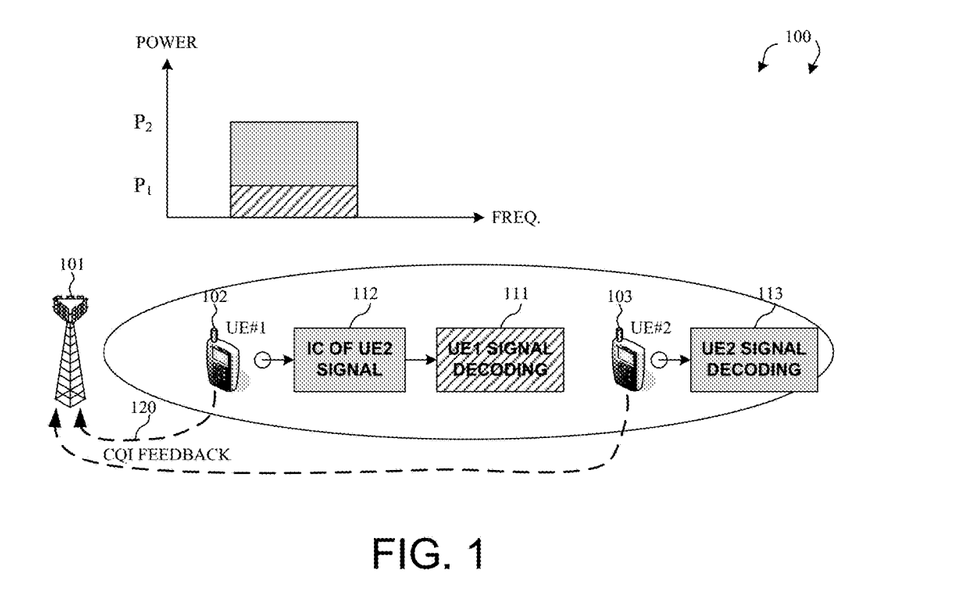
FIG. 1 illustrates a mobile communication network with channel state information (CSI) feedback enhancement for multiuser superposition transmission (MUST) in accordance with one novel aspect.

FIG. 1 illustrates a mobile communication network 100 with channel state information (CSI) feedback enhancement for multiuser superposition transmission (MUST) in accordance with one novel aspect. Mobile communication network 100 is an OFDM network comprising a serving base station eNB 101, a first user equipment 102 (UE#1), and a second user equipment 103 (UE#2). In 3GPP LTE system based on OFDMA downlink, the radio resource is partitioned into subframes in time domain, each subframe is comprised of two slots. Each OFDMA symbol further consists of a number of OFDMA subcarriers in frequency domain depending on the system bandwidth. The basic unit of the resource grid is called Resource Element (RE), which spans an OFDMA subcarrier over one OFDMA symbol. REs are grouped into resource blocks (RBs), where each RB consists of 12 consecutive subcarriers in one slot.

Several physical downlink channels and reference signals are defined to use a set of resource elements carrying information originating from higher layers. For downlink channels, the Physical Downlink Shared Channel (PDSCH) is the main data-bearing downlink channel in LTE, while the Physical Downlink Control Channel (PDCCH) is used to carry downlink control information (DCI) in LTE. The control information may include scheduling decision, information related to reference signal information, rules forming the corresponding transport block (TB) to be carried by PDSCH, and power control command. For reference signals, Cell-specific reference signals (CRS) are utilized by UEs for the demodulation of control/data channels in non-precoded or codebook-based precoded transmission modes, radio link monitoring and measurements of channel state information (CSI) feedback. UE-specific reference signals (DM-RS) are utilized by UEs for the demodulation of control/data channels in non-codebook-based precoded transmission modes.

In the example of FIG. 1, downlink multiuser superposition transmission (MUST) scheme is used. In MUST, the signals intended for two users are superposed and occupy the same time-frequency radio resource. To benefit from MUST, the two co-scheduled users generally need to have a large difference in the received signal quality, e.g., in terms of the received signal-to-interference-plus-noise ratio (SINR). In a typical scenario, one of the users (e.g., UE#1) is geometrically close to the base station, and the other user (e.g., UE#2) is geometrically far away from the base station. The former user and the latter user are also referred to as the near-user and far-user respectively.

In order to apply MUST precoding, the transmitting station is required to know the Channel State Information (CSI) of the radio channels connecting it to each of the receiving stations for transmission. In 3GPP LTE systems, it is common for the receiving stations (e.g., UEs) to measure CSI and report CSI to the transmitting station (e.g., eNB) via an uplink feedback channel. The content of CSI feedback contains RI (rank indicator), CQI (channel quality indicator), and PMI (precoding matrix indicator) for each downlink channel.

Assume eNB 101 is equipped with $N_t$ transmit antennas, and UE 102 has $N_r$ receive antennas. When UE#1 reports the Rank Index (RI) equal to 2 and the precoding matrix index (PMI) corresponding to the matrix $[u_1, u_2]$, the determination of the CQI is based on the received signal y which is obtained after intercell-interference-plus-noise whitening. As shown in FIG. 1, UE#1 receives intra-cell interfering radio signal 112 transmitted from the same serving eNB 101 due to non-orthogonal multiple access (NOMA) operation intended for multiple UEs (e.g., UE#2) in the same serving cell. UE#1 may be equipped with an interference cancellation (IC) receiver that is capable of cancelling the contribution of the interfering signal 112 from the desired signal 111. For NOMA operation, the signals to the two UEs are superposed and precoded with the same precoder having PMI corresponding to the matrix $[u_1, u_2]$, and transmitted over two spatial beams. The received signal y at UE#1 is obtained after intercell-interference-plus-noise whitening and is given as the following equation:

$$y=H(u_1\sqrt{P/2}x_1+u_2\sqrt{P/2}x_2)+w=h_1\sqrt{P/2}x_1+h_2\sqrt{P/2}x_2+w \qquad (1)$$

Where
  H is the wireless channel matrix, $h_1=Hu_1$, $h_2=Hu_2$
  P is the total transmit power
  $x_1$ and $x_2$ are the modulated symbols on the two spatial beams, and
  w is the contribution of the whitened intercell-interference-plus-noise with the covariance matrix equal to the identity matrix I.

In the current LTE communication system, UE#1 determines CQI based on the output SINRs of an MMSE receiver, given as:

$$SINR_{fb}^{(1)} = (P/2)h_1^H(I + (P/2)h_2 h_2^H)^{-1} h_1 \quad (2)$$

$$= \frac{P}{2}\left(\|h_1\|^2 - \frac{(P/2)|h_1^H h_2|^2}{1+(P/2)\|h_2\|^2}\right)$$

$$SINR_{fb}^{(2)} = \frac{P}{2}\left(\|h_2\|^2 - \frac{(P/2)|h_2^H h_1|^2}{1+(P/2)\|h_1\|^2}\right) \quad (3)$$

Where
$SINR_{fb}^{(1)}$ and $SINR_{fb}^{(2)}$ are the feedback SINRs by UE#1 at the two beams for RI=RANK-2

However, the feedback SINRs may not be the same as the actual SINRs of UE#1 due to different MUST scheduling scenarios. In accordance with one novel aspect, when a UE reports RI=Rank-2 and PMI=[$u_1$, $u_2$], besides two Rank-2 CQIs, one Rank-1 CQI is also reported, as depicted by CQI feedback 120. In other words, besides the two SINRs in equations (2) and (3), the UE additionally report CQIs based on SINRs that corresponds to a RANK-1 single-beam transmission:

$$SINR_{fb}^{(3)} = P\|h_1\|^2 \quad (4)$$

If the UE reports all SINRs given in equations (2), (3), and (4) for RI=RANK-2, then the scheduling eNB can calculate the actual SINRs based on different MUST scenarios and thereby determining appropriate modulation and coding scheme (MCS) for the UE. Furthermore, if the granularity of the CQI table cannot reflect the high values of the SINRs in (4), then a predefined scaling factor (0<β<1) known to both the eNB and the UE may be multiplied in front of power P. For example, a 4-bit CQI table can reflect SNR range from 0~15 dB only, but cannot distinguish actual SNR that is higher than 16 dB. If the RANK-1 single-beam SNR is 20 dB, then by multiplying a scaling factor β=0.5, then the 4-bit CQI table is able to reflect the high value of such SNR.

Figure 2:
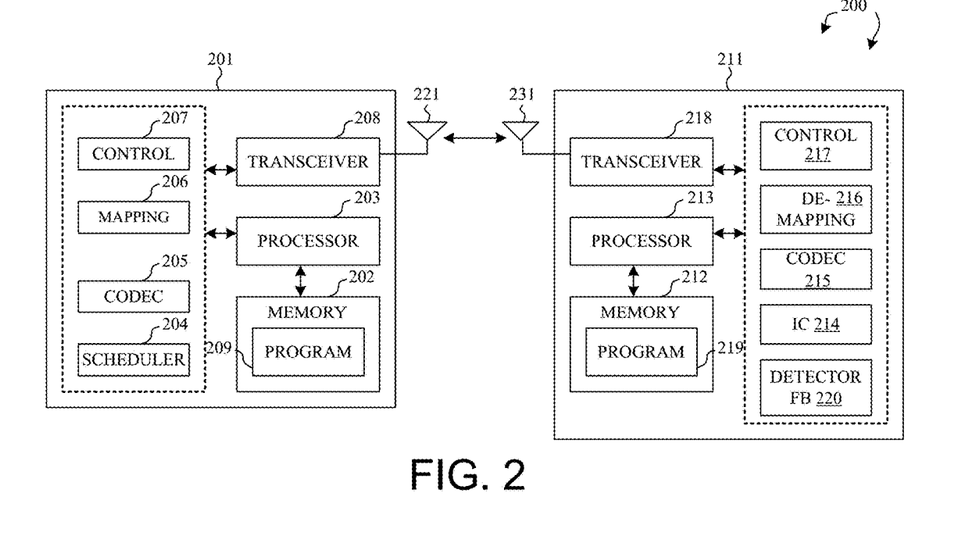
FIG. 2 is a simplified block diagram of a base station and a user equipment that carry out certain embodiments of the present invention.

FIG. 2 is a simplified block diagram of a base station 201 and a user equipment 211 that carry out certain embodiments of the present invention in a mobile communication network 200. For base station 201, antenna 221 transmits and receives radio signals. RF transceiver module 208, coupled with the antenna, receives RF signals from the antenna, converts them to baseband signals and sends them to processor 203. RF transceiver 208 also converts received baseband signals from the processor, converts them to RF signals, and sends out to antenna 221. Processor 203 processes the received baseband signals and invokes different functional modules to perform features in base station 201. Memory 202 stores program instructions and data 209 to control the operations of the base station. Similar configuration exists in UE 211 where antenna 231 transmits and receives RF signals. RF transceiver module 218, coupled with the antenna, receives RF signals from the antenna, converts them to baseband signals and sends them to processor 213. The RF transceiver 218 also converts received baseband signals from the processor, converts them to RF signals, and sends out to antenna 231. Processor 213 processes the received baseband signals and invokes different functional modules to perform features in UE 211. Memory 212 stores program instructions and data 219 to control the operations of the UE.

Base station 201 and UE 211 also include several functional modules and circuits to carry out some embodiments of the present invention. The different functional modules are circuits that can be configured and implemented by software, firmware, hardware, or any combination thereof. The function modules, when executed by the processors 203 and 213 (e.g., via executing program codes 209 and 219), for example, allow base station 201 to schedule (via scheduler 204), encode (via codec 205), mapping (via mapping circuit 206), and transmit control information and data (via control circuit 207) to UE 211, and allow UE 211 to receive, de-mapping (via de-mapper 216), and decode (via codec 215) the control information and data (via control circuit 217) accordingly with interference cancellation capability. In one example, base station 201 provides assistant information that include parameters related to interfering signals to UE 211. Upon receiving the related parameters, UE 211 is then able to perform interference cancellation via interference canceller 214 to cancel the contribution of the interfering signals accordingly. In another example, UE 211 performs reference signal detection and measurements and provides enhanced CSI feedback information via a detector and feedback module FB 220 to BS 201. Upon receiving the CSI feedback information, BS 201 can calculate the actual SINRs based on different MUST scenarios and thereby determining the MCS for the UE accordingly.

Figure 3:
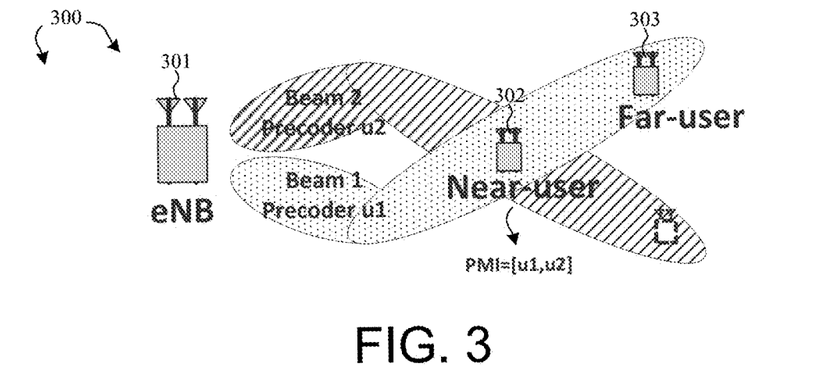
FIG. 3 illustrates a first embodiment for CSI feedback enhancement in MUST scheme in accordance with one novel aspect.

FIG. 3 illustrates a first embodiment for CSI feedback enhancement in MUST scheme in a wireless communication network 300 in accordance with one novel aspect. Wireless communication network 300 comprises a base station 301, a near-user 302, and a far-user 303. In the example of FIG. 3, MUST is implemented in the first Beam#1 but not in the second Beam#2. The received signal of the near-user after the intercell-interference-plus-noise whitening is given as:

$$y = H(u_1(\sqrt{\alpha P}x_{1,N} + \sqrt{(1-\alpha)P/2}x_{1,F}) + u_2\sqrt{P/2}x_2) + w = h_1(\sqrt{\alpha P/2}x_{1,N} + \sqrt{(1-\alpha)P/2}x_{1,F}) + h_2\sqrt{P/2}x_2 + w \quad (5)$$

Where
H is the wireless channel matrix, $h_1 = Hu_1$, $h_2 = Hu_2$
P is the total transmit power
α is the power splitting factor for MUST
$x_{1,N}$ is the modulated symbols intended for the near-user at the first beam
$x_{1,F}$ is the modulated symbols intended for the far-user at the first beam
$x_2$ is the modulated symbol carried at the second beam Assume the near-user reports RI equal to two and the PMI corresponding to [$u_1$, $u_2$]. Assume an MMSE receiver is used by the near-user to separate signals in two beams. In this case, the near-user feedback CQIs at the two beams correspond to the SINRs at the first and the second beams are:

$$SINR_{fb}^{(1)} = (P/2)h_1^H(I + (P/2)h_2 h_2^H)^{-1} h_1 \quad (6)$$

$$= \frac{P}{2}\left(\|h_1\|^2 - \frac{(P/2)|h_1^H h_2|^2}{1+(P/2)\|h_2\|^2}\right)$$

$$SINR_{fb}^{(2)} = \frac{P}{2}\left(\|h_2\|^2 - \frac{(P/2)|h_2^H h_1|^2}{1+(P/2)\|h_1\|^2}\right) \quad (7)$$

Assume perfect intra-beam IC at the near-user receiver. It can be shown the actual output SINRs at the near-user receiver are:

$$SINR_{actual}^{(1)} = \frac{\alpha P}{2}\left(\|h_1\|^2 - \frac{(P/2)|h_1^H h_2|^2}{1+(P/2)\|h_2\|^2}\right) \quad (8)$$

-continued $$SINR_{actual}^{(2)} = \frac{P}{2}\left(\|h_2\|^2 - \frac{(\alpha P/2)|h_2^H h_1|^2}{1+(\alpha P/2)\|h_1\|^2}\right) \quad (9)$$

Note that since the MMSE receiver is used for beam separation, the actual output SINR at the second beam is given as in equation (9) instead of being equal to $(P/2)\|h_2\|^2$. It can be seen that with feedback CQI SINRs in equations (6) and (7), the scheduler is in general unable to determine the true output SINR given in equation (9). The reason is that there are three unknown variables $\|h_1\|^2$, $\|h_2\|^2$, and $|h_2^H h_1|^2$ in equation (9), while we have only two given SINRs from equations (6) and (7). If the UE further reports the SINR given in the following equation (10) for a RANK-1 single beam transmission (may be applied with a scaling factor β), then the scheduler can calculate the SINR given in equation (9):

$$SINR_{fb}^{(3)}=P\|h_1\|^2 \text{ and/or } SINR_{fb}^{(3)}=P\|h_2\|^2 \quad (10)$$

Figure 4:
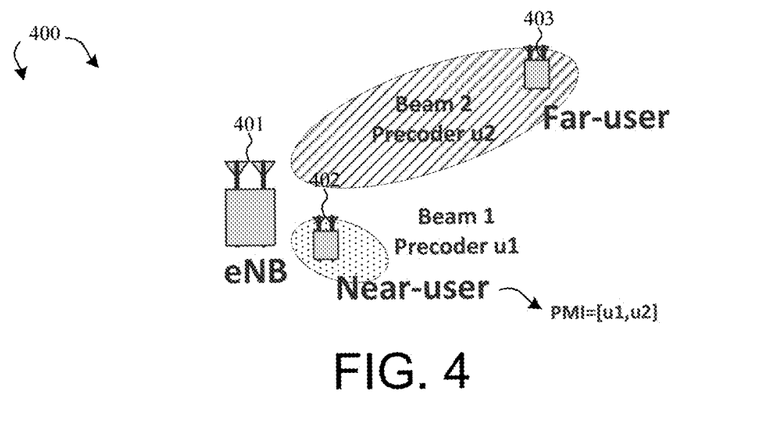
FIG. 4 illustrates a second embodiment for CSI feedback enhancement in MUST scheme in accordance with one novel aspect.

FIG. 4 illustrates a second embodiment for CSI feedback enhancement in MUST scheme in a wireless communication network 400 in accordance with one novel aspect. Wireless communication network 400 comprises a base station 401, a near-user 402, and a far-user 403. In the example of FIG. 4, different precoders are applied to signals intended for the near- and far-users. The received signal of the near-user is given as:

$$y=H(u_1\sqrt{\alpha P/2}x_N+u_2\sqrt{(1-\alpha)P/2}x_F)+w=h_1\sqrt{\alpha P/2}x_N+h_2 \sqrt{(1-\alpha)P/2}x_F+w \quad (11)$$

Where
H is the wireless channel matrix, $h_1=Hu_1$, $h_2=Hu_2$
P is the total transmit power
α is the power splitting factor for MUST
$x_N$ is the symbol intended for the near-user
$x_F$ is the symbol intended for the far-user We assume the near-user reports the RI equal to two and the PMI corresponding to $[u_1, u_2]$. If an MMSE receiver is used, the CQIs at the two beams corresponding to SINRs are:

$$SINR_{fb}^{(1)} = (P/2)h_1^H(I+(P/2)h_2h_2^H)^{-1}h_1 \quad (12)$$
$$= \frac{P}{2}\left(\|h_1\|^2 - \frac{(P/2)|h_1^H h_2|^2}{1+(P/2)\|h_2\|^2}\right)$$

$$SINR_{fb}^{(2)} = \frac{P}{2}\left(\|h_2\|^2 - \frac{(P/2)|h_2^H h_1|^2}{1+(P/2)\|h_1\|^2}\right) \quad (13)$$

In the signal reception, suppose the near-user can perfectly cancel the signal intended for the far-user. Therefore, the near-user actual received SINR is:

$$SINR_{actual}=\alpha P\|h_1\|^2 \quad (14)$$

The far-user actual received SINR is:

$$SINR_{actual} = (1-\alpha)P\left(\|h_2\|^2 - \frac{(\alpha P)|h_2^H h_1|^2}{1+(\alpha P)\|h_1\|^2}\right) \quad (15)$$

If the UE further reports the SINR given in the following equation (16) for a RANK-1 single beam transmission (may be applied with a scaling factor β), then the scheduler can calculate the SINR given in equation (14) and (15):

$$SINR_{fb}^{(3)}=P\|h_1\|^2 \text{ and/or } SINR_{fb}^{(3)}=P\|h_2\|^2 \quad (16)$$

Figure 5:
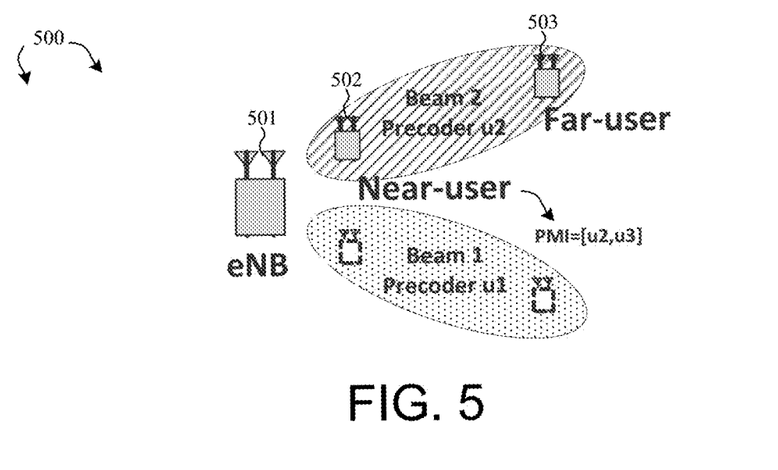
FIG. 5 illustrates a third embodiment for CSI feedback enhancement in MUST scheme in accordance with one novel aspect.

FIG. 5 illustrates a third embodiment for CSI feedback enhancement in MUST scheme in a wireless communication network 500 in accordance with one novel aspect. Wireless communication network 500 comprises a base station 501, a near-user 502, and a far-user 503. In the example of FIG. 5, MUST is implemented in the second Beam#2 but not in the first Beam#1. In addition, the actual transmission uses precoders $[u_2, u_3]$, while the PMI reported by the near-user corresponds to the matrix $[u_1, u_2]$. As a result, the received signal of the near-user after the intercell-interference-plus-noise whitening is given as:

$$y=H(u_2\sqrt{P/2}x_1+u_3(\sqrt{\alpha P/2}x_{2,N}+\sqrt{(1-\alpha)P/2}x_{2,F}))+w=h_2 \sqrt{P/2}x_1+h_3(\sqrt{\alpha P/2}x_{2,N}+\sqrt{(1-\alpha)P/2}x_{2,F})+w \quad (17)$$

Where
H is the wireless channel matrix, $h_2=Hu_2$, $h_3=Hu_3$
P is the total transmit power
α is the power splitting factor for MUST
$x_1$ is the symbol carried at the first beam
$x_{2,N}$ is the modulated symbols intended for the near-user at the second beam
$x_{2,F}$ is the modulated symbols intended for the far-user at the second beam We assume the near-user reports the RI equal to two and the PMI corresponding to $[u_1, u_2]$. If an MMSE receiver is used, the SINRs corresponding to the CQIs reported by the near-user are:

$$SINR_{fb}^{(1)} = (P/2)h_1^H(I+(P/2)h_2h_2^H)^{-1}h_1 \quad (18)$$
$$= \frac{P}{2}\left(\|h_1\|^2 - \frac{(P/2)|h_1^H h_2|^2}{1+(P/2)\|h_2\|^2}\right)$$

$$SINR_{fb}^{(2)} = \frac{P}{2}\left(\|h_2\|^2 - \frac{(P/2)|h_2^H h_1|^2}{1+(P/2)\|h_1\|^2}\right) \quad (19)$$

However, the actual SINRs perceived by the near-user and the far-user in the received signal are:

$$SINR_{actual}^{(1)} = \frac{\alpha P}{2}\left(\|h_2\|^2 - \frac{(P/2)|h_2^H h_3|^2}{1+(P/2)\|h_3\|^2}\right) \quad (20)$$

$$SINR_{actual}^{(2)} = \frac{\frac{\mu_F P}{2}\left(\|h_2\|^2 - \frac{(P/2)|h_2^H h_3|^2}{1+(P/2)\|h_3\|^2}\right)}{\frac{\mu_N P}{2}\left(\|h_2\|^2 - \frac{(P/2)|h_2^H h_3|^2}{1+(P/2)\|h_3\|^2}\right)+1} \quad (21)$$

If the UE reports SINR in equation (22) below (may be applied with a scaling factor β) along with those in equations (18) and (19), then the BS can compute the quantities $\|h_1\|^2$, $\|h_2\|^2$, and $|h_2^H h_1|^2$. This helps to the determination of the actual SINR in equation (20) if the scheduler can perform estimation based on the available quantities:

$$SINR_{fb}^{(3)}=P\|h_1\|^2 \text{ and/or } SINR_{fb}^{(3)}=P\|h_2\|^2 \quad (22)$$

Figure 6:
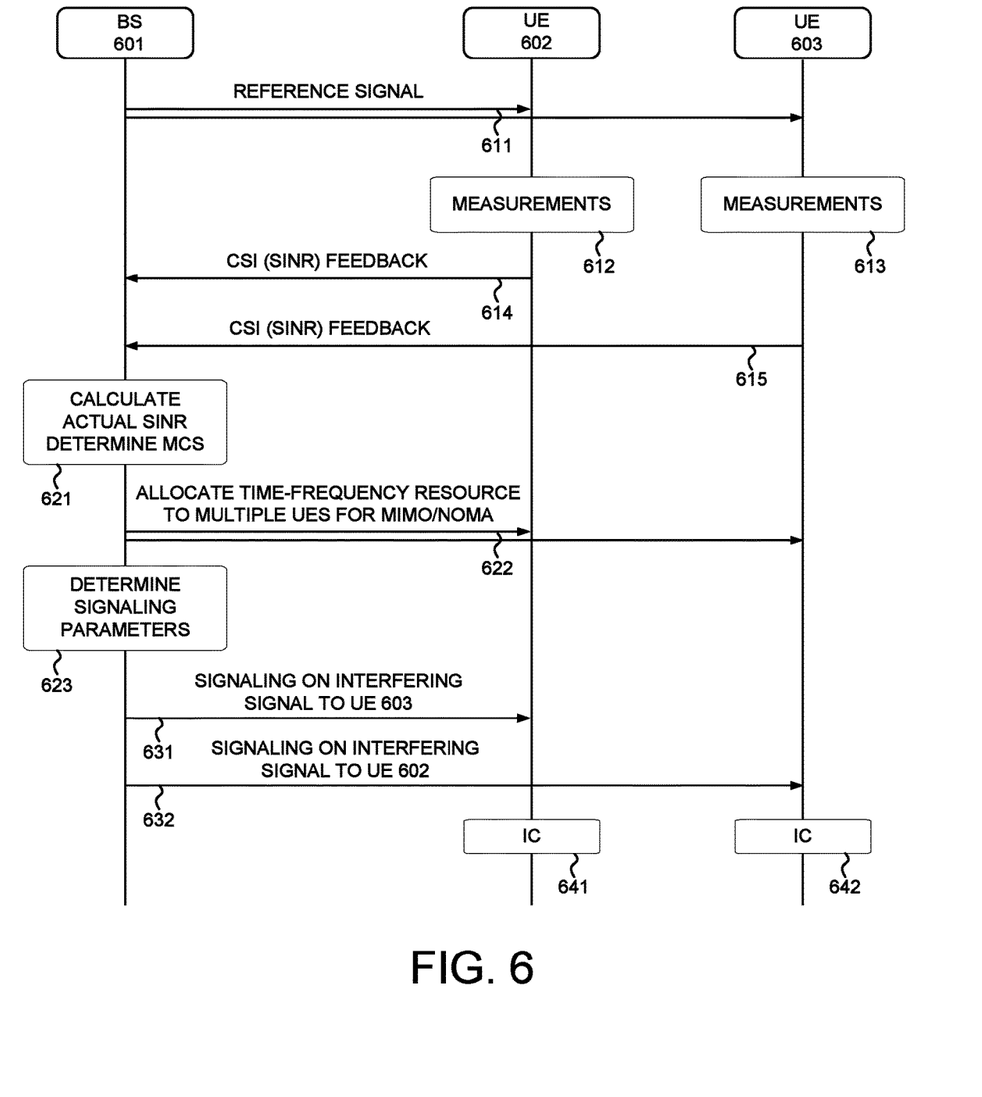
FIG. 6 illustrates a downlink MUST procedure between a BS and two UEs with enhanced CSI feedback in accordance with one novel aspect.

FIG. 6 illustrates a downlink MUST procedure between a BS and two UEs with enhanced CSI feedback in accordance with one novel aspect. In step 611, a base station BS 601 periodically transmits cell-specific reference signals (CRS) to UE 602 and UE 603. In step 612, UE 602 performs radio signal measurements based on the periodically received CRS reference signals. In step 613, UE 603 performs radio signal measurements based on the periodically received CRS reference signals. In step 614, UE 602 reports channel state information (CSI) feedback to BS 601. In step 615, UE 603 reports CSI feedback to BS 601. The content of CSI feedback contains RI (rank indicator), CQI (channel quality indicator), and PMI (precoding matrix indicator) for each downlink channel. The determination of CQI is based on the received signal-to-interference-plus-noise ratio (SINR). In accordance with one novel aspect, when UE 602 or UE 603 reports RI=Rank-2 with a precoding matrix (PMI), besides two Rank-2 CQIs, one Rank-1 CQI is also reported.

In step 621, based on the CSI feedback, BS 601 determines the modulation and coding scheme (MCS) for the next to-be-scheduled downlink transmission involving different MUST scenarios. In step 622, BS 601 allocates a time-frequency resource to multiple UEs including UE 602 and UE 603 for MU-MIMO or NOMA operation. In step 623, BS 601 determines which parameters about interfering signals need to be signaled to the UEs. In step 631, BS 601 signals UE 602 information about interfering signals dedicated to UE 603. In step 632, BS 601 signals UE 603 information about interfering signals dedicated to UE 602. In step 641, UE 602 performs IC based on the received information. In step 642, UE 603 performs IC based on the received information.

Figure 7:
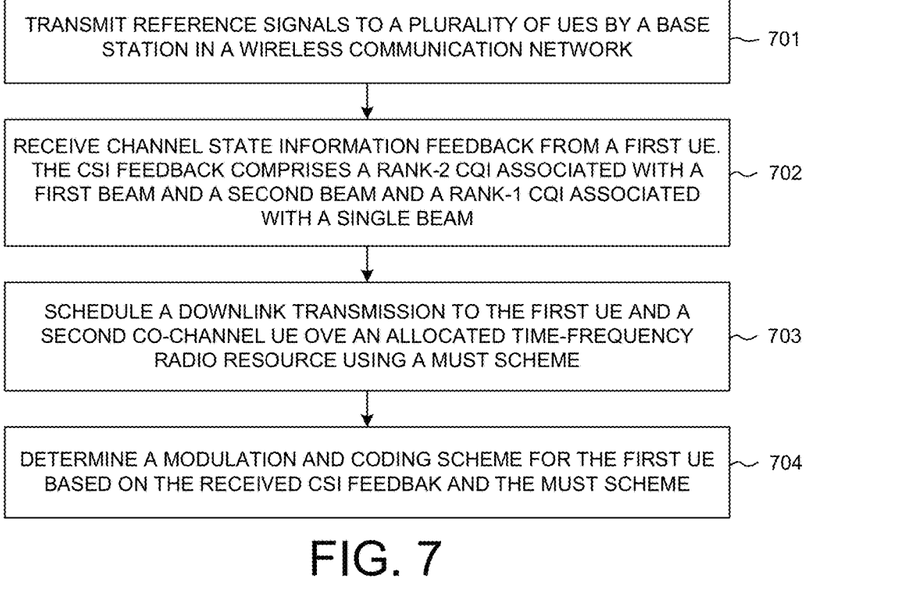
FIG. 7 is a flow chart of a method of performing MUST with enhanced CSI feedback from eNB perspective in accordance with one novel aspect.

FIG. 7 is a flow chart of a method of performing MUST with enhanced CSI feedback from eNB perspective in accordance with one novel aspect. In step 701, a base station transmits reference signals to a plurality of user equipments (UEs) in a wireless communication network. In step 702, the base station receives channel state information (CSI) feedback from a first UE. The CSI feedback comprises a RANK-2 channel quality indicator (CQI) associated with a first beam and a second beam and a RANK-1 CQI associated with a single beam. In step 703, the base station schedules a downlink transmission to the first UE and a second co-channel UE over an allocated time-frequency radio resource using a multiuser superposition transmission (MUST) scheme. In step 704, the base station determines a modulation and coding scheme (MCS) for the first UE based on the received CSI feedback and the MUST scheme. In one example, the RANK-2 CQI comprises a first feedback signal to interference plus noise ratio (SINR) at the first beam and a second feedback SINR at the second beam, and the RANK-1 CQI comprises a third feedback SINR at the single beam measured by the UE.

Figure 8:
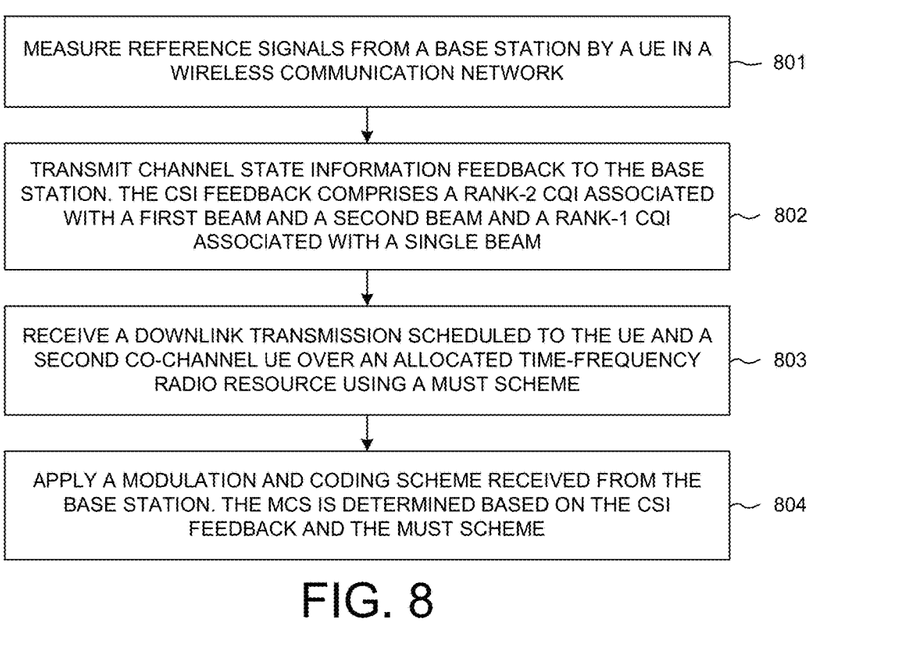
FIG. 8 is a flow chart of a method of performing MUST with enhanced CSI feedback from UE perspective in accordance with one novel aspect.

FIG. 8 is a flow chart of a method of performing MUST with enhanced CSI feedback from UE perspective in accordance with one novel aspect. In step 801, a UE measures reference signals from a base station in a wireless communication network. In step 802, the UE transmits channel state information (CSI) feedback to the base station. The CSI feedback comprises a RANK-2 channel quality indicator (CQI) associated with a first beam and a second beam and a RANK-1 CQI associated with a single beam. In step 803, the UE receives a downlink transmission scheduled to the UE and a second co-channel UE over an allocated time-frequency radio resource using a multiuser superposition transmission (MUST) scheme. In step 804, the UE applies a modulation and coding scheme (MCS) received from the base station, wherein the MCS is determined based on the CSI feedback and the MUST scheme. In one example, the RANK-2 CQI comprises a first feedback signal to interference plus noise ratio (SINR) at the first beam and a second feedback SINR at the second beam, and the RANK-1 CQI comprises a third feedback SINR at the single beam measured by the UE.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
transmitting reference signals to a plurality of user equipments (UEs) by a base station in a wireless communication network;
receiving channel state information (CSI) feedback from a first UE, wherein the CSI feedback comprises a RANK-2 channel quality indicator (CQI) associated with a first beam and a second beam and a RANK-1 CQI associated with a single beam;
scheduling a downlink transmission to the first UE and a second co-channel UE over an allocated time-frequency radio resource using a multiuser superposition transmission (MUST) scheme; and
determining a modulation and coding scheme (MCS) for the first UE based on the received CSI feedback and the MUST scheme.

2. The method of claim 1, wherein the RANK-2 CQI comprises a first feedback signal to interference plus noise ratio (SINR) at the first beam and a second feedback SINR at the second beam, and wherein the RANK-1 CQI comprises a third feedback SINR at the single beam.

3. The method of claim 2, wherein the base station calculates an actual SINR of the first UE corresponds to the MUST scheme using the first, second, and third feedback SINRs.

4. The method of claim 2, wherein the third feedback SINR is a result of multiplying a UE-measured single beam SINR with a predefined scaling factor.

5. The method of claim 1, wherein the MUST scheme is applied in the first beam but not in the second beam.

6. The method of claim 1, wherein a first precoder is applied to signals intended for the first UE, and wherein a second precoder is applied to signals intended for the second co-channel UE.

7. The method of claim 1, wherein the RANK-2 CQI is based on a first precoding matrix, and wherein a second precoding matrix is applied to signals intended for the first UE.

8. A method comprising:
measuring reference signals from a base station by a user equipment (UE) in a wireless communication network;
transmitting channel state information (CSI) feedback to the base station, wherein the CSI feedback comprises a RANK-2 channel quality indicator (CQI) associated with a first beam and a second beam and a RANK-1 CQI associated with a single beam;
receiving a downlink transmission scheduled to the UE and a second co-channel UE over an allocated time-frequency radio resource using a multiuser superposition transmission (MUST) scheme; and
applying a modulation and coding scheme (MCS) received from the base station, wherein the MCS is determined based on the CSI feedback and the MUST scheme.

9. The method of claim 8, wherein the RANK-2 CQI comprises a first feedback signal to interference plus noise ratio (SINR) at the first beam and the second feedback SINR at a second beam, and wherein the RANK-1 CQI comprises a third feedback SINR at the single beam.

10. The method of claim 9, wherein an actual SINR of the UE corresponds to the MUST scheme is calculated using the first, the second, and the third feedback SINRs.

11. The method of claim 9, wherein the third feedback SINR is a result of multiplying a UE-measured single beam SINR with a predefined scaling factor.

12. The method of claim 8, wherein the MUST scheme is applied in the first beam but not in the second beam.

13. The method of claim 8, wherein a first precoder is applied to signals intended for the UE, and wherein a second precoder is applied to signals intended for the second co-channel UE.

14. The method of claim 8, wherein the RANK-2 CQI is based on a first precoding matrix, and wherein a second precoding matrix is applied to signals intended for the UE.

15. A user equipment (UE) comprising:
 a radio signal detector that detects and measures reference signals from a base station in a wireless communication network;
 a transmitter that transmits channel state information (CSI) feedback from the UE, wherein the CSI feedback comprises a RANK-2 channel quality indicator (CQI) associated with a first beam and a second beam and a RANK-1 CQI associated with a single beam;
 a receiver that receives a downlink transmission scheduled to the UE and a second co-channel UE over an allocated time-frequency radio resource using a multiuser superposition transmission (MUST) scheme; and
 a detector that applies a modulation and coding scheme (MCS) received from the base station, wherein the MCS is determined based on the CSI feedback and the MUST scheme.

16. The UE of claim 15, wherein the RANK-2 CQI comprises a first feedback signal to interference plus noise ratio (SINR) at the first beam and the second feedback SINR at a second beam, and wherein the RANK-1 CQI comprises a third feedback SINR at the single beam.

17. The UE of claim 16, wherein an actual SINR of the UE corresponds to the MUST scheme is calculated using the first, the second, and the third feedback SINRs.

18. The UE of claim 16, wherein the third feedback SINR is a result of multiplying a UE-measured single beam SINR with a predefined scaling factor.

19. The UE of claim 15, wherein the MUST scheme is applied in the first beam but not in the second beam.

20. The UE of claim 15, wherein a first precoder is applied to signals intended for the UE, and wherein a second precoder is applied to signals intended for the second co-channel UE.

21. The UE of claim 15, wherein the RANK-2 CQI is based on a first precoding matrix, and wherein a second precoding matrix is applied to signals intended for the UE.

* * * * *